United States Patent Office 3,282,978
Patented Nov. 1, 1966

3,282,978
PROCESS FOR PREPARING S-(2-HYDROXYL) ESTERS
Edward A. Swakon, Hammond, Ind., assignor to Standard Oil Company, Chicago, Ill., a corporation of Indiana
No Drawing. Filed July 19, 1962, Ser. No. 211,119
6 Claims. (Cl. 260—455)

This invention relates to 2-(hydroxyl) esters and more specifically pertains to S-(2-hydroxyl) esters of thiolcarbamic acid and a method for preparing these esters.

R. Riemschneider and O. Lorenz, Monatsh. 84, 518–21 (1953) describe the preparation of S-esters of thiolcarbamic acid

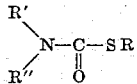

by a two-step reaction involving first reacting phosgene with a mercaptan to form

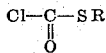

which is then reacted with a primary or secondary amine to obtain the above S-esters of thiolcarbamic acid or monothiolcarbamic acid. Although a number of S-esters of thiolcarbamic acids are disclosed as being prepared by this method, no S-(2-hydroxyl) esters such as the S-(2-hydroxyethyl) esters are disclosed. If

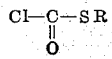

compounds were to be reacted with an amino alcohol, for example ethanol amine; there would be competitive reactions between the amino group and the hydroxyl group providing a mixture of thiolcarbamic and thiocarbonates containing perhaps, primarily the thiocarbonate. Moreover, in Chemical Abstracts, 50, 1032e there is disclosed S-(2-hydroxyethyl) thiolcarbamate the lowest member of the class S-(2-hydroxyalkyl) thiolcarbamate:

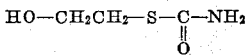

But this reference does not disclose N-disubstituted derivatives of this S-(2-hydroxyethyl) ester or other S-(2-hydroxyl) esters.

S-alkyl, S-cycloalkyl and S-aryl esters of thiolcarbamic acids have been suggested as being useful additives for lubricants to promote thermal and oxidation stabilization, for active ingredients in insecticidal, fungicidal and bactericidal compositions and for accelerating and/or promoting the vulcanization of rubbery materials because of the presence of the

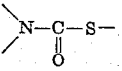

group. To find use as intermediates in chemical reactions, they are dependent on the presence of functional groups as substituents on the N-substituents or on the ester-forming group.

It has now been discovered that S-(2-hydroxy) esters of N,N-dihydro-carbon-substituted disubstituted monothiolcarbamic acids can be prepared by reacting an olefin oxide with a N,N-disubstituted monothiolcarbamic acid which has the formula:

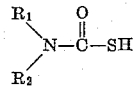

wherein $R_1$ and $R_2$ may be the same or different alkyl, aryl, aralkyl, alicyclic, heterocyclic oxygen, nitrogen or sulfur containing ring groups or $R_1$ and $R_2$ together with the nitrogen can be a heterocyclic group, e.g. pyrrol, pyrrolidyl, pyrazolyl, pyrazolinyl, piperidinyl, imidazolyl, indolyl, beta-methylindolyl, acridinyl, carbazolyl, morpholinyl, and the like groups. N,N-disubstituted monothiolcarbamic acids can be prepared as their amine salts by reacting carbonyl sulfide with two moles of a secondary amine or one mole each of a secondary amine and tertiary amine. The olefin oxide need not be reacted with the amine salt of the monothiolcarbamic acid per se but said reactant can be formed in situ either by reacting a secondary amine with carbonyl sulfide in the presence of olefin oxide or by adding carbon monoxide to a mixture of secondary amine, sulfur and olefin oxide.

The reactions may be carried out at any suitable temperature, e.g. in the range of 0 to 300° C. at reaction times up to 24 hours or more. The lower temperatures are associated with the longer reaction periods, and the shorter reaction periods are associated with the higher reaction temperatures. When an olefin oxide is reacted with a N,N-disubstituted monothiolcarbamic acid through its amine salt, reaction temperatures as low as 0° C. and reaction pressure of ambient atmospheric pressure can be employed. Where the process of this invention is carried out by first forming the N,N-disubstituted monothiolcarbamate from CO, S and amine, reaction temperatures of 50° C. and above are employed. Since many of the reactants, especially lower molecular weight amines and olefin oxides and carbonyl sulfide are quite volatile at the above temperature range and since carbon monoxide is a gas, the reactions are desirably carried out in a closed vessel to prevent loss of the reactants. The reactions also can be carried out at pressures in the range of from 1 to 1000 atmospheres. The use of superatmospheric pressure of from 10 to 1000 atmospheres is especially useful when the carbon monoxide, sulfur, secondary amine and olefin oxide are reacted or when the stepwise reaction of first reacting carbon monoxide, secondary amine and sulfur is followed by reaction with olefin oxide.

There does not appear to be any limitation on the nature of the $R_1$ and $R_2$ groups of the secondary amine reactant or these same groups present in the monothiolcarbamic acid. If the $R_1$ and $R_2$ groups or when they are part of a heterocyclic ring also contain substituent groups reactive with COS or the olefin oxide, compensation for the amount of COS or olefin oxide so consumed is made to obtain the S-(2-hydroxyl) ester. The group $R_1$ and/or $R_2$ or the aforementioned heterocyclic group containing $R_1$, $R_2$ and the nitrogen of the secondary amine or monothiolcarbamic acid can also contain secondary amino groups in the case of the use of the preparation of monothiolcarbamic acids in situ or in the case where the monothiolcarbamic acid has been prepared from a polysecondary amine, e.g. $R_1$ and/or $R_2$ is p-methylamino N-phenyl benzylamine, 4,4'-di(methylamino) N-phenyl benzylamine, N-methyl, N'-ethyl ethylene diamine, and the like. $R_1$ and/or $R_2$ can contain a hydroxy group as derived from a di(hydroxyalkyl) amine, a carbalkoxy group as derived from an ester of an amino acid such as methyl pyrrolidine-alpha-acetate, and others.

Suitable as olefin oxide reactants are those containing at least one epoxy:

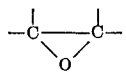

group. Illustrative of these olefin oxides are those compounds wherein the four valences indicated above are satisfied by hydrogen, alkyl, alicyclic, aryl and alkyl substituted aryl, heterocyclic, etc. groups. It is the epoxy group which provides the reactant portion of the olefin oxide reactant. If there are also present substituent groups which will also react with the monothiolcarbamic acid, or CO, or S, or the secondary amine, the amount of reactants need only be adjusted to compensate for these side reactions. In such a case, the S-(2-hydroxyl) esters will be formed and the resulting product may be quite complex. Typical olefin oxide reactants include ethylene oxide, propylene oxide, 2,3-epoxy butane, styrene oxide, 4-methyl styrene oxide, octylene oxides and cyclohexene oxide among others.

As secondary amine precursors of the monothiolcarbamates in addition to those hereinbefore indicated, there may be used diethylamine, dipropylamines, dibutylamines, diamylamines, dicyclohexylamines, diphenylamine, dibenzylamine, methylphenylamine, methylcyclohexylamine, and others of the classes hereinbefore defined.

The process of this invention may be illustrated by the following specific examples.

*Example 1*

COS is bubbled into dibutylamine (65 grams, 0.5 mole) until 15 grams (0.25 mole) are absorbed. The resulting solution of dibutylammonium monothiol dibutylcarbamate is transferred to a 300 ml. stainless steel reactor. Propylene oxide (15 grams, 0.25 mole) is added. The reaction is heated slowly to 200° C. over a three-hour period. 90 grams of clear dark amber liquid is obtained. Seventy-six grams of this material are distilled as follows:

| Cut | Temperature | | Pres. mm./Hg | Amount, g. | Comment |
|---|---|---|---|---|---|
| | Pot | Overhead | | | |
| 1 | 25–120 | 25–35 | 0.3 | 19.59 | Mostly dibutylamine. |
| 2 | 125–153 | 55–57 | 0.4 | 3.22 | Mostly 2-dibutylaminopropanol. |
| 3 | 168–172 | 130–136 | 0.5 | 16.20 | Product. |
| 4 | 165–171 | 135–145 | 1.1 | 16.69 | Do. |
| 5 | 171–186 | 146 | 1.1 | 12.18 | Do. |

Cut 2 has the same boiling point and gas chromatography retention time as 2-dibutylaminopropanol prepared from dibutylamine and propylene oxide.

The infra-red spectra of Cuts 3, 4 and 5 are identical and have an absorption band at 2.9 microns for the hydroxyl group and an absorption band at 6.1 microns for the thiocarbamate group. This material is assigned the following structure:

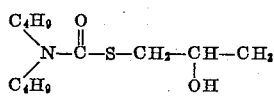

S-(2-hydroxylpropyl)-dibutylthiocarbamate (86 mole percent conversion).

*Example 2*

A 300 ml. stainless steel reactor is charged with 65 grams dibutylamine, 10 grams sulfur, 15 grams propylene oxide and 600 p.s.i. carbon monoxide and heated over a three-hour period until temperature reaches 248° C. After cooling to room temperature, 95 grams of dark liquid is obtained which evolves a gas. 56 grams of this material is distilled under reduced pressure. The following cuts were obtained:

| Cut | Temperature, ° C. | | Grams Collected | Comment |
|---|---|---|---|---|
| | Pot | Overhead | | |
| 1 | 25–92 | [1] 28–53/10 | 12.7 | Mostly n-butylamine. |
| 2 | 92–140 | [1] 56–66/0.6–2.5 | 13.04 | Mostly 2-dibutylamine propanol. |
| 3 | 154–165 | 120–123/0.7 | 12.63 | Mostly product. |
| 4 | 165–190 | 133–134/0.6 | 5.95 | Do. |

[1] Mm.

Cut 2 boiling at 56–60/0.6–2.5 mm. is mostly 2-dibutylaminopropanol and gives identical retention time on gas chromatography with 2-dibutylaminopropanol prepared from dibutylamine and propylene oxide. The infra-red spectra of Cuts 3 and 4 are identical and have an absorption band at 3.0 microns for the hydroxyl group and a band at 6.1–6.2 microns for the thiolcarbamate group. This material is assigned the following structure:

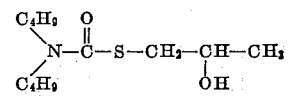

*Example 3*

Carbonyl sulfide is bubbled into a mixture of 65 grams di-n-butylamine (0.5 mole) and 135 grams triethylamine until 40 grams (.66 mole) is absorbed. This solution is divided into two portions. To one-half of solution at 10° C. is added 15 grams ethylene oxide. This solution is transferred to a 300 ml. stainless steel pressure reactor and heated to 52° C. for four hours. Maximum pressure developed is 110 p.s.i.g. 123 grams of grey opaque liquid is recovered. Low boiling materials is stripped by heating the product on steam bath. 57.68 grams of this material was distilled and the following fractions collected:

| Cut | Boiling Range ° C./mm. Hg | Grams Collected |
|---|---|---|
| 1 | Condensate in dry ice trap | 20 |
| 2 | 24–44/0.9 | 3.6 |
| 3 | 74–88/0.6 | 1.11 |
| 4 | 110–136/0.4 | 15.74 |
| 5 | 130/0.4 | 2.55 |
| Bottoms | | 10.57 |

Infra-red spectra of Cuts 4 and 5 were alike and had an absorption band at 2.9 mμ for the OH group and one at 6.1–6.2 mμ for the thiocarbamate group. The following structure was assigned:

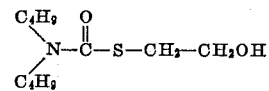

*Example 4*

To the other half of triethylammonium monothiodibutylcarbamate described in Example 3 was added 40 grams of styrene oxide and the solution transferred to a 300 ml. stainless steel pressure reactor. Reaction mixture was rocked and heated at 52° C. for four hours. Maximum pressure reached was 110 p.s.i.g. 153 grams of amber liquid was recovered. 70.84 grams of this material was distilled and bulk of the material distilled with difficulty at 193° C./1.6 mm. Infra-red spectrum on this fraction showed an absorption band at 2.95 mμ for the hydroxyl group and one at 6.1–6.2 mμ for the carbonyl group. The following structure was assigned:

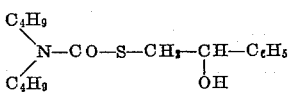

Elemental analysis is in fair agreement—
*Analysis.*—Calculated for $C_{17}H_{27}O_2NS$: C, 66.1; H, 8.84; N, 4.55; S, 10.35. Found: C, 67.69; H, 8.74; N, 4.09; S, 10.2.

*Example 5*

52 grams of COS was added to a solution of 130 grams dibutylamine and 202 grams triethylamine in a 3-neck flask with stirring. 45 grams of ethylene oxide was bubbled into this solution. The reaction was mildly exothermic and the temperature was controlled by placing the flask in cold water. After about an hour, the product was distilled. During distillation, a white waxy solid formed and 23 grams of light tan waxy solid was recovered as bottoms. This material is believed to be polyethylene sulfide. 65 grams of S-2-hydroxylethyl-N,N-dibutylthiocarbamate is obtained which distilled at 133° C./0.5 mm. 10 grams of 2-hydroxyethyl dibutylamine was obtained which distilled at 128–140° C./1.5 mm. Infra-red spectrum was also in agreement with the structure for the product.

*Example 6*

Eleven grams of COS was added to a mixture of 32.5 grams dibutylamine and 50 grams pyridine in a 3-neck flask with stirring. 15 grams of ethylene oxide was then added. After an hour, the product was distilled. 30 grams of product, 2-hydroxyethyl carbamate of dibutylamine was obtained which distilled at 145–151° C./0.7–1.1 mm. The waxy solid observed in Example 5 did not occur and its formation may be associated with the base solvent.

What is claimed is:
1. A method of preparing S-(2-hydroxyl) esters of N,N-dihydrocarbon-substituted monothiocarbamic acids which comprises reacting an ammonium salt of a N,N'dihydrocarbon-substituted monothiolcarbamic acid with an olefin oxide selected from the group consisting of ethylene oxide, propylene oxide, 2,3-epoxy butane, styrene oxide, 4-methyl styrene oxide, octylene oxides and cyclohexene oxide at a temperature in the range of 0 to 300° C., wherein said dihydrocarbon substituents are selected from the class consisting of diethyl, dipropyl, dibutyl, diamyl, dicyclohexyl, diphenyl, dibenzyl, methylphenyl and methylcyclohexyl hydrocarbon substituents on the nitrogen of the respective ester product and the monothiolcarbamic acid.

2. The method of claim 1 wherein the ammonium salt is formed in situ by first reacting a N,N-dihydrocarbon amine having said dihydrocarbon substituents with carbonyl sulfide and then reacting said olefin oxide under said conditions.

3. The method of claim 1 wherein the ammonium salt is formed in situ by first reacting carbon monoxide, sulfur and a N,N-dihydrocarbon substituted amine having said dihydrocarbon substituents and then reacting said olefin oxide under said conditions.

4. A method of preparing S-(2-hydroxypropyl) N,N-dibutyl monothiolcarbamate of the structure:

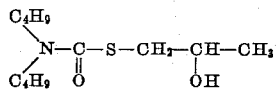

by first reacting N,N-dibutylamine with carbonyl sulfide to form dibutyl-ammonium N,N-dibutyl monothiolcarbamate and then reacting this ammonium salt with propylene oxide at 200° C.

5. A method of preparing S-(2-hydroxyethyl) N,N-dibutyl monothiolcarbamate of the structure:

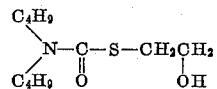

by first reacting a substantially equimolecular mixture N,N-dibutylamine and triethylamine with carbonyl sulfide to form triethylammonium N,N-dibutyl monothiolcarbamate and then reacting said salt with ethylene oxide at 52° C.

6. A method of preparing S(2-hydroxy-2-phenylethyl) N,N-dibutyl monothiolcarbamate of the structure:

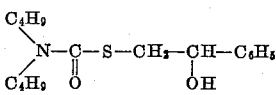

by reacting triethyl ammonium N,N-dibutyl monothiolcarbamate with styrene oxide at 52° C.

References Cited by the Examiner

UNITED STATES PATENTS 3,028,417   4/1962   Eisenmann _____ 260—455 XR
3,126,406   3/1964   Tilles et al. _____ 260—455
3,167,571   1/1965   D'Amico et al. _____ 260—455

CHARLES B. PARKER, *Primary Examiner.*

DANIEL D. HOROWITZ, *Examiner.*

DALE R. MAHANAND, *Assistant Examiner.*